US009704361B1

(12) United States Patent
Hazlewood et al.

(10) Patent No.: US 9,704,361 B1
(45) Date of Patent: Jul. 11, 2017

(54) PROJECTING CONTENT WITHIN AN ENVIRONMENT

(75) Inventors: William R. Hazlewood, Seattle, WA (US); Shweta D. Grampurohit, Seattle, WA (US); Daniel C. Bay, Santa Clara, CA (US); Sunny A. Consolvo, Mountain View, CA (US); Beverly L. Harrison, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1075 days.

(21) Appl. No.: 13/585,705

(22) Filed: Aug. 14, 2012

(51) Int. Cl.
*G08B 13/196* (2006.01)

(52) U.S. Cl.
CPC .............................. *G08B 13/19634* (2013.01)

(58) Field of Classification Search
None
See application file for complete search history.

(56) References Cited

U.S. PATENT DOCUMENTS

| 2007/0182812 A1* | 8/2007 | Ritchey | ................ | H04N 5/2254 348/36 |
| 2010/0220189 A1* | 9/2010 | Yanagi | ..................... | B60R 1/00 348/148 |
| 2010/0253521 A1* | 10/2010 | Williams, Sr. | ......... | G06Q 10/06 340/572.1 |
| 2012/0223885 A1 | 9/2012 | Perez | | |

FOREIGN PATENT DOCUMENTS

WO      WO2011088053      7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Eileen Adams
(74) *Attorney, Agent, or Firm* — Lee & Hayes, PLLC (57) ABSTRACT

A user may input one or more messages (e.g., visual or audio content) with respect to a projection device that is to project the messages to users within an environment. The user may additionally input related information that dictates a context and manner in which the messages are to be projected. The projection device may monitor the environment to identify users, events or actions within the environment. Upon detecting and identifying a particular user, the projection device may visually project the messages onto a surface within the environment, or may audibly output the messages within the environment, which may convey a particular meaning to that user. Optionally, the projection device may authenticate the user in order to determine that the user is the intended recipient of the messages.

22 Claims, 6 Drawing Sheets

PROJECTING CONTENT WITHIN AN ENVIRONMENT

BACKGROUND

Existing security and surveillance systems, either in the home or in other environments, may include door and window sensors, coupled with motion sensors, to detect when someone enters and exits that environment. Such motion sensors may include video or audio monitoring that allows a system to capture video, images, or audio that reflects the current state of the environment and the actions of people within that environment. With respect to a security system, the system may implement various security measures, such as sounding an audible alarm, when it is determined that an unauthorized person is present. On the other hand, surveillance systems are typically limited to receiving input (e.g., video, images, audio, etc.) without being able to provide any output or content to the environment. As a result, such systems are unable to provide rich and context dependent interaction between persons that use the system and between those persons and the system itself.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

This disclosure describes systems and processes for projecting context-dependent and user-specific output to users within an environment. More particularly, the systems and processes described herein may receive input from one or more users. Then, based at least partly on the input, a capture and projection device (e.g., camera, video recorder, microphone, etc.) may be utilized to monitor for specific users, actions, or events that may be present or that may occur within the environment. Such a device may then provide output to users based at least partly on a particular user's presence within the environment and/or actions taken by certain users within that environment. The output may be projected by the device and may include visual or audible messages or warnings, text, images, graphics, colors, lights, or any other type of content that may convey a particular meaning to a user. In some embodiments, the output provided to the users may be provided in response to the device identifying or authenticating one or more users that are determined to be within the environment.

In various embodiments, the output that is provided to users may be messages that are based at least partly on the identification of users within an environment and/or the location of those users in the environment. In particular, a first user may input to the device one or more messages that are intended either for himself or for a different user. In addition to the message, the first user may input information related to the message, such as a manner, a time, or a location in which the message is to be presented. Provided that the message is intended for the first user, when the device determines that the first user in a particular location of the environment, the device may project or output the message(s) intended for that user. In some embodiments, the first user may be authenticated prior to receiving the message(s) and the message(s) provided to the first user may be based on the information that is initially input and the particular location of the first user within the environment.

Similarly, when it is determined that a second user is within a particular location within the environment, the device may project or output the one or messages that were previously input by the first user, that are associated with that particular location, and that are determined to be relevant to the second user. The manner in which the message(s) are output to the second user may be based at least partly on the preferences that were specified by the first user. For example, if the first user wanted to remind the second user to change the laundry, the first user may input such a message, including the location and manner in which the message should be provided. The device then may output or project the message to the second user (e.g., "please change the laundry") when the second user is determined to be in close proximity to the location specified by the first user (e.g., near the laundry room, when the user walked in the door, etc.). As a result, customized messages may be projected to users at a relevant time and location.

In other embodiments, in addition to projecting messages or reminders to users, the systems and processes described herein may provide visual or audio warnings to users. More particularly, user may input specific objects or events within an environment that may pose a danger to one or more users. The device may then monitor the environment (e.g., capture video, audio, images, etc.) in order to identify these particular objects or events. The occurrence of such events or objects may trigger the device to visually project warnings as well as project audio cues that alert the users of such dangers. The warnings may be specific to a particular event or multiple events and/or may be associated with a particular user. For instance, assume that a parent of a small child is concerned about their child falling down the stairs or touching a hot stove. The parent may then input respective indications of these events/objects into the device and, when the child is in close proximity to the stairs or the stove, the device may project a visual and/or audio warning that may alert the child of such dangers.

The discussion begins with a section, entitled "Example Environment," describing an example system for monitoring an environment and projection various output in response to identifying various users or actions. Next, the discussion includes a section, entitled "Projection of Messages," describing an example system of projecting context-dependent and user-specific messages within an environment. The discussion then moves on to a "Projection of Warnings" section that describes an example process for projecting warnings within an environment. Afterwards, the discussion includes an "Example Projection Device" section that illustrates an example projection device, including components and module associated therewith. The discussion then proceeds to an "Example Process for Projecting Messages" section that illustrates an example process for projecting messages within an environment. Next, the discussion turns to a "Example Process for Projecting Warnings" section that illustrates an example process for projecting warnings within an environment. The discussion then includes a section, entitled "Example Processes," that illustrates and describes example processes for projecting relevant output to users. Lastly, the discussion includes a brief "Conclusion".

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Example Environment

Figure 1:
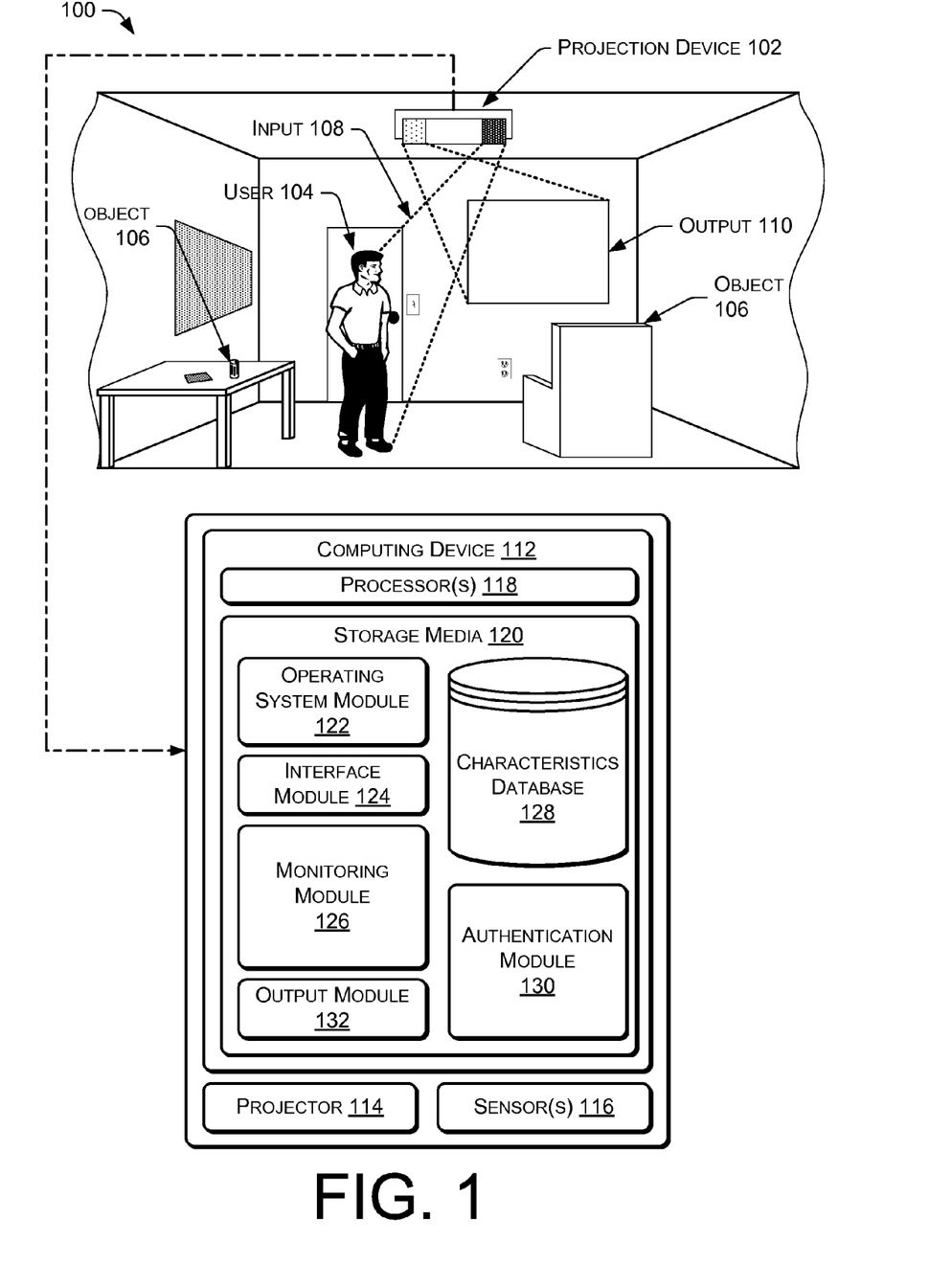
FIG. 1 is a diagram showing an example system including a projection device that is configured to monitor an environment and to project output in response thereto.

FIG. 1 illustrates an example system or environment 100 for projecting context-appropriate and user-specific output to users within an environment. Such output may be specifically directed to a particular user and may be visual (e.g., text, graphics, images, video content, lights, colors, etc.) or audio (e.g., a recorded or digitally-generated voice, sirens, beeping, etc.). As a result, when a particular user is identified within the environment and/or when it is determined that the user has performed a certain action, output that is relevant to that context may be projected to that user. Accordingly, that user may receive a customized message that conveys a particular meaning that is relevant to the user.

In various embodiments, the output that is projected to users may be based at least partly on various types of information input by a user. For example, a first user may identify one or more messages or reminders that are to be directed to themselves or different users. With those messages, the first user may identify a context and a manner in which those messages are to be projected, the user(s) that are to receive the message(s), and/or an urgency of the messages. The system 100 may store such information for subsequent use. When it is determined that the context or conditions input by the first user are satisfied, the system 100 may project the message(s) in the manner specified by the first user. For instance, provided that the first user identified a message that should be projected on a wall when the second user enters a home, the system 100 may project that message on the wall when the system 100 determines that the second user has in fact entered the home and possibly after the second user is authenticated. Moreover, the first user may elect to remind himself about various goals or lifestyle decisions. For instance, the first user may cause the system 100 to project the amount of calories on a piece of cake when the first user comes in close proximity to the cake. In addition, the system 100 may then project healthy alternatives to the first user.

In other embodiments, the first user may specify certain outputs that are to be projected if one or more users perform a certain action. For example, the system 100 may project messages or warnings that alert users to objects that may pose a danger within an environment. That is, the first user may input certain messages or warnings that are to be projected when it is determined that a particular user (e.g., a child) performs some action, such as coming within a predetermined proximity of an object (e.g., stairs, a hot stove, an electrical outlet, etc.). In response to the system 100 determining that the user has performed that action, the system 100 may project a message or warning (e.g., an audible or visual warning, alarms, beeping, flashing lights, an image, etc.) that may alert the user of the potential danger. As a result, a user may manage the types of output that are projected to users within an environment by identifying certain conditions that are to trigger the output.

As shown in FIG. 1, the system 100 may represent an environment for detecting one or more users or objects within the environment and then projecting various output in response thereto. In particular, the system 100 may include a projection device 102, one or more users 104, one or more objects 106, various input 108, and output 110 that is to be projected within the environment. Moreover, the projection device 102 may include a computing device 112, a projector 114, and one or more sensor(s) 116. The computing device 112 may include one or more processor(s) 118 and storage media 120, where the storage media 120 may include an operating system module 122, an interface module 124, a monitoring module 126, a characteristics database 128, an authentication module 130, and an output module 132. Moreover, some or all of the modules illustrated in FIG. 1 may reside in a remote location, such as in a server accessible via a network.

In various embodiments, the system 100 may illustrate an augmented reality environment that includes a projection device 102 that is configured to perform the techniques and processes described herein. While the environment 100 illustrates a single projection device 102, in some instances an environment may include multiple different projection devices 102 stationed in different locations throughout the environment, and/or in adjacent environments. When active, the projection device 102 may monitor the environment for users 104 (e.g., humans, animals, etc.) and other objects 106, which may include physical items within the environment (e.g., furniture, walls, appliances, etc.). In addition to receiving input directly from a user 104, the projection device 102 may receive input 108 as a result of the monitoring. Based at least in part on the input 108, the projection device 102 may project various output 110, which may include audible content or visual content that may be projected onto any surface within the environment, thereby generating an augmented reality environment that may incorporate real-world objects 106 within the environment.

That is, the projection device 102 may receive and store information provided by a user 104, monitor for and detect users 104 or objects 106 that are within the environment (e.g., input 108), and then project output 110 (e.g., audible and/or visual content) to the users 104 within the environment. In addition, the projection device 102 may maintain a record of the users 104 and objects 106 that frequent the environment and attempt to identify and authenticate such users 104 or objects 106 when they appear within the environment. For instance, upon identifying and authenticating a particular authorized user 104, the projection device 102 may project a customized output 110 (e.g., an audible or visual message or warning) to the user 104.

As stated above, the projection device 102 may monitor the environment for one or more users 104 and objects 106. The users 104 may include persons that live in, work in, or are otherwise associated with the environment (e.g., a home, workplace, etc.). Moreover, the objects 106 may include any physical items that may be situated in the environment, such as furniture, appliances, artwork, decorations, etc. The projection device 102 may monitor the environment and identify the users 104 and objects 106, which may be treated as input 108 for the projection device 102. Based at least partly on the input 108, the projection device 102 may project context-dependent and user-specific output 110 within the environment.

Moreover, the computing device 112 of the projection device 102 may reside within a housing of the projection device 102 or may reside at another location that is operatively connected to the projection device 102. As shown, the computing device 112 may include one or more processor(s) 118, which may execute one or more modules and/or processes to cause the projection device 104 to perform a variety of functions, as set forth above and explained in further detail in the following disclosure. In some embodiments, the processor(s) 118 may include a central processing unit (CPU), a graphics processing unit (GPU), both CPU and GPU, or other processing units or components known in the art. Additionally, each of the processor(s) 118 may possess its own local memory, which also may store program modules, program data, and/or one or more operating systems. In some embodiments, the processor(s) 118 may be configured to execute instructions that may be stored in the storage media 120 or in other storage media 120 accessible to the processor(s) 118.

Although not shown, an input/output (I/O) interface, meanwhile, may be configured to couple the computing device 112 to other components of the projection device 102, such as the projector 114, the sensor(s) 116, other projection devices 102 (such as in other environments or in the environment 100), other computing devices, sirens, network communication devices (such as modems, routers, and wireless transmitters), a conventional security system, and so forth. The coupling between the computing device 112 and other devices may be via wire, fiber optic cable, wireless connection, or the like.

The storage media 120 of the computing device 112 may include non-transitory computer-readable storage media ("CRSM"). The CRSM may be any available physical media accessible by a computing device to implement the instructions stored thereon. The CRSM may include, but is not limited to, random access memory ("RAM"), read-only memory ("ROM"), electrically erasable programmable read-only memory ("EEPROM"), flash memory, or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 112. The storage media 120 may reside within the housing of the projection device 102, on one or more storage devices accessible on a local network, on cloud storage accessible via a wide area network, or in any other accessible location. The CRSM does not include communication media, such as signals or carrier waves.

The storage media 120 may store several modules, such as instructions, datastores, and so forth that are configured to execute on the processor(s) 118. For instance, the storage media 120 may store an operating system module 122, an interface module 124, a monitoring module 126, a characteristics database 128, an authentication module 130, and an output module 132.

The operating system module 122 may be configured to manage hardware and services within and coupled to the computing device 112 for the benefit of other modules. The interface module 124, meanwhile, may be configured to receive and interpret commands received from users 104 within the environment 100. In various embodiments, via the interface module 124, the users 104 may input messages, warnings, reminders, etc. (e.g., output 110), that are to be projected by the projector 114 of the projection device 102, audibly output by one or more speakers of the projection device 102, or the like. The users 104 may also input other information, such as a context and a manner in which the output 110 is to be projected. For instance, users 104 may specify when the output 110 is to be projected (e.g., when a particular user 104 enters the environment) and how the output 110 is to be projected (e.g., audibly, visually, etc.). As a result, the interface module 124 may allow the users 104 to specify when customized output 110 is to be projected within the environment.

In addition, the interface module 124 may analyze and parse images and/or video captured by one or more cameras of the sensor(s) 116 (e.g., input 108) to identify users 104 and objects 106 within the environment and to identify gestures made by those users 104 within the environment. In other instances, the interface module 124 may identify commands audibly issued by users 104 within the environment and captured by one or more microphones of the sensor(s) 116. In still other instances, and as stated above, the interface module 124 may allow users 104 to interface and interact with the projection device 102 in any way, such as via physical controls, and the like.

The information provided by users 104 via the interface module 124 may be stored in the characteristics database 128. That is, the messages, warnings, etc., that are to be subsequently projected by the projection device 102, including the context in manner in which the output 110 is to be projected, may be maintained by the characteristics database 128. The characteristics database 128 may also store known users 104 or objects 106, and data that represents the images, video, and audio monitored and collected by the sensor(s) 116 of the projection device 102. The information input by the users 104 and the data collected by the sensor(s) 116 may then be utilized to determine when, how, where, and to whom the output 110 should be projected by the projector 114.

For the purposes of this discussion, the projector 114 may be any type of device, component, or module that is configured to project the output 110 within the environment. The projector 114 may visually project text, images, video, lights, colors, etc., that may convey meaning to one or more users 104 within the environment.

Moreover, the sensor(s) 116 may sense or detect any users 104 or objects 106 within the environment, including any movement or changes within the environment. In various embodiments, the sensor(s) 116 may include one or more image sensors such as one or more cameras (motion and/or still cameras), audio sensors such as microphones, ultrasound transducers, heat sensors, motion detectors (including infrared imaging devices), depth sensing cameras, weight sensors, touch sensors, tactile output devices, olfactory sensors, temperature sensors, humidity sensors, and pressure sensors. Other sensor types may be utilized without departing from the scope of the present disclosure.

The monitoring module 126 may receive data from the sensor(s) 116, which may be continuously or periodically monitoring the environment. For example, the monitoring module 126 may receive video or still images, audio data, infrared images, and so forth. The monitoring module 126 may receive data from active sensors, such as ultrasonic, microwave, radar, light detection and ranging (LIDAR) sensors, and the like. With respect to a user 104 or object 106 within the environment, the sensing of the environmental data may be passive or involve some amount of interaction with the sensor(s) 116. For example, a user 104 may interact with a fingerprint scanner, an iris scanner, a microphone, or a keypad within the environment.

In various embodiments, the monitoring module 126 may detect in real-time, or near real-time, the presence of a user 104 or object 106 within the environment based on the received data. This may include detecting motion based on the environmental data received by the monitoring module 126. For instance, the monitoring module 126 may detect motion in the environment, an altered heat signature within the environment, vibrations (which may indicate a user 104 walking within the environment), sounds (such as the sound of words, footsteps, etc.), increased/decreased humidity or temperature (which may indicate a fire or malfunctioning appliance), or other environmental data that indicates the presence of a user 104 or an object 106 within the environment.

The monitoring module 126 may determine one or more characteristics of the users 104 or objects 106 within the environment using the captured data. As with detection, sensing of the environmental data used to determine characteristics of the users 104 may either be passive from the perspective of the users 104, or may involve interaction by the users 104 with the environment. For example, the users 104 may pick up a book and turn to a particular page, tap a code onto a wall or door of the environment, walk into, out of, or within the environment, or perform one or more other gestures. The characteristics of the users 104 may be used to determine, or attempt to determine, an identity of the users 104. For example, the characteristics may be facial characteristics captured using one or more still images or video images. The characteristics may also include other biometrics such as gait, mannerisms, audio characteristics such as vocal characteristics, olfactory characteristics, walking vibration patterns, and the like.

In some embodiments, the monitoring module 126 may attempt to determine the identity of the users 104 based at least partly on one or more of the determined characteristics, such as by attempting to match one or more of the determined characteristics to characteristics of known users 104 maintained in the characteristics database 128. When the determined characteristics match the known characteristics within a threshold likelihood, such as at least 80%, 90%, 99.9%, or 99.99% likelihood, the monitoring module 126 may determine that a particular user 104 is "known" and identified. For instance, if the monitoring module 126 is more than 95% confident that a detected user 104 is a known user 104 (e.g., the mom or a child in the household), then the monitoring module 126 may determine that the detected user 104 is known and identified. The monitoring module 126 may use a combination of characteristics, such as face recognition and vocal characteristics, to identify the users 104 that are common to the environment.

As stated above, the monitoring module 126 may determine when users 104 enter or exit the environment, and when users 104 move or make gestures within the environment, which may include various rooms within the environment. In addition to detecting where users 104 are located within the environment, the monitoring module 126 may also identify the particular user 104 that is within the environment. As a result, since the location and identity of a user 104 may be determined, the projection device 102 may project output 110 (e.g., messages, warnings, etc.) that are specifically directed or are relevant to a particular user 104.

The monitoring module 126 may interact with the authentication module 130 to further authenticate the users 104 within the environment. For instance, the users 104 may perform one or more authentication actions, such as gestures, spoken password, providing voice input, code or passphrase, tapping a pattern onto a surface of the environment, interactions with a reference object (such as a book, glass, or other item in the environment), or some other physical action that can be used to authenticate the users 104. The authentication module 130 may also utilize speech recognition to determine a password, code, or passphrase spoken by the users 104. The authentication module 130 may extract voice data from audio data (such as from a microphone) to determine a voice signature of the users 104, and to determine the identity of the users 104 based at least on a comparison of the detected voice signature with known voice signatures of known users 104. The authentication module 130 may perform one or more of these actions to authenticate the users 104, such as by both comparing a voice signature to known voice signatures and listening for a code or password/passphrase. The authentication module 130 may receive sensor data from the one or more sensor(s) 116 to enable the authentication. In various embodiments, authenticating the users 104 may be in addition to, or instead of, determining an identity of the users 104 by the monitoring module 126.

In various embodiments, the identification, authentication, and/or authorization functions may be provide wholly or partially by another device, such as a device that is network-coupled to the projection device 102, such as through the Internet or other networks. Thus, sensor data may be provided to the "cloud," which may return an identity of a particular one of the users 104, a determination that the user 104 is authorized, and/or a determination that the user 104 is authenticated. In the same or alternative embodiments, known user 104 characteristics may be provided via a cloud infrastructure. In some embodiments, a failure to identify, authorize, or authenticate a detected user 104 by the projection device 102 may cause the projection device 102 to provide the sensor data to the cloud for cloud-based identification, authorization, or authentication.

Provided that a particular user 104 has been detected, identified, and/or authenticated, the output module 132 may project the output 110 within the environment. That is, depending upon the user 104 that is identified, the output module 132 may cause the projector 114 to project messages, warnings, etc., that are specifically directed at that user 104. For instance, based at least partly on that user's 104 detected actions, the output module 132 may cause the projector 114 to project one or more messages to the user 104, where the messages may have been input by that user 104 or by one or more other users 104. Similarly, the output module 132 may cause the projector 114 to project a warning message to a particular user 104 if it is determined that that user 104 is in close proximity to a known or potential danger (e.g., a child near stairs, a hot stove, etc.). As a result, the projection device 102 may project customized output 110 to different users 104 within the environment depending upon which users 104 are actually present within the environment.

Projection of Messages

Figure 2:
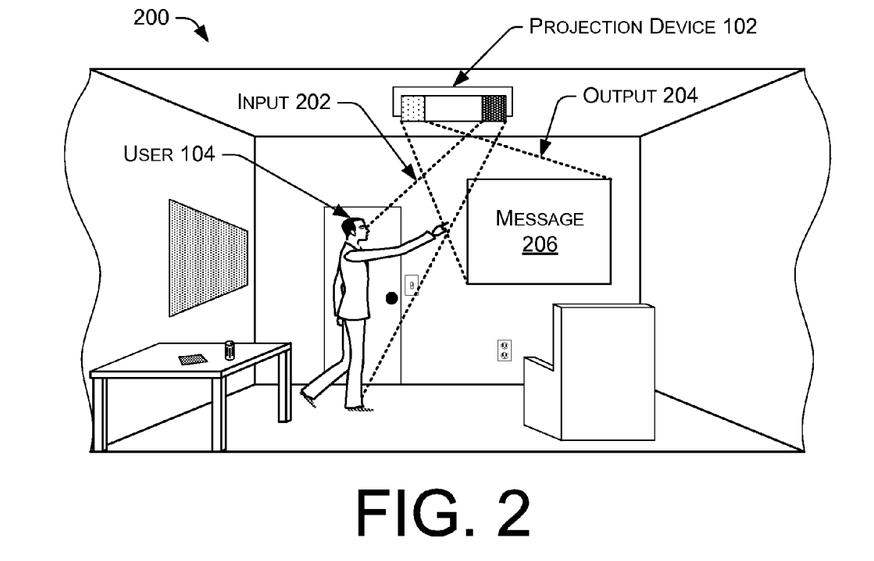
FIG. 2 is a diagram showing an example environment that includes a projection device that may project one or more messages to users within the environment.

FIG. 2 illustrates a diagram representing an example system 200 for projecting messages to users within an environment. There are multiple ways in which users within the same environment can interact with one another. However, instead of manually writing the messages down, exchanging messages electronically (e.g., via e-mail or text message), or using a telephone, the system 200 allows for specific messages to be projected to particular users when those users are detected within the environment, are identified, and/or are authenticated. In various embodiments, the message(s) may be visually projected on a surface within the environment or the message(s) may be output audibly so that the message(s) can be heard by a user.

As shown, the system 200 may include a projection device 102, as described with respect to FIG. 1, a user 104, an input 202, an output 204, and a message 206. Although the projection device 102 appears to be situated on the ceiling of the environment, the projection device 102 may be placed anywhere within the environment, provided that the projection device 102 is able to capture input 202 (e.g., images, video, audio, etc.) from the environment and project the messages 206 within the environment. As illustrated, the user 104 may be situated within the environment. The projection device 102 may detect the presence of the user 104, which may be represented by input 202. In response to receiving the input 202, the projection device 102 may identify and/or authenticate the user 104. The projection device 102 may then identify the message(s) 206 that are associated with that user 104, and project at least one of the messages 206 as output 204. Here, the message 206 may be visually projected onto a wall, or some other surface, of the environment that is visible to the user 104. Alternatively, the message 206 may be audibly output within the environment. In some embodiments, the projection device 102 may authenticate the user 104 that is to receive the projected message 206 so that the message 206 is not projected or otherwise output to unintended recipients.

In some embodiments, a first user 104 may desire to leave a message 206 (or multiple messages 206) for themselves and/or for a second user 104. For the purposes of this discussion, the message 206 may include text, graphics, images, or audible content (e.g., a voice, etc.). The first user 104 may input this message 206 into the projection device 102 in any manner. For instance, the first user 104 may input such a message 206 verbally using speech recognition, using a computing device or mobile device (e.g., telephone, smartphone, tablet computer, laptop computer, electronic book (eBook), etc.), an application associated with a computing device or mobile device, via an image (e.g., capturing an image of text or an image), etc. With the message 206, the first user 104 may also specify the intended recipient, when the message 206 is to be projected, an urgency of the message 206, and a manner in which the message 206 is to be projected. That is, the first user 104 may specify one or more conditions associated with the message 206. When those conditions are satisfied, the projection device 102 may proceed with projecting the message 206 to the intended user 104 within the environment.

Upon receiving the message 206 and the accompanying information provided by the first user 104, the projection device 102 may maintain this data for future use. In some embodiments, when the projection device 102 detects and identifies the user 104 that is intended to receive the message 206, the projection device 102 may seek to authenticate that user 104. In other words, the projection device 102 may attempt to determine whether the detected user 104 is actually the user 104 that is intended to be the recipient of the message 206. Using the techniques described above with respect to FIG. 1, the detected user 104 may attempt to authenticate himself. If the detected user 104 is not authenticated, the projection device 102 may refrain from projecting any messages 206.

However, if the detected user 104 is successfully authenticated, the projection device 102 may determine whether there are any messages 206 that are intended for, or that are relevant to, that user 104. If so, the projection device 102 may project those messages 206 to the detected user 104 in the manner specified by the first user 104. The projected messages 206 may be text-based, images, videos, graphics, or any other type of content that can convey meaning to the detected user 104. For example, the message 206 may instruct the detected user 104 to clean their room or to change the laundry. Moreover, the message 206 may be a reminder to eat a healthy snack instead of eating a piece of cake that is on the kitchen counter. To accomplish this, the projection device 102 may project a red circle around the piece of cake, thus dissuading the user 104 from eating the cake, while concurrently projecting a more attractive pattern around a healthier alternative (e.g., a bowl of fruit), thereby encouraging the user 104 to eat a piece of fruit instead. In addition, a first user 104 may leave a particular message 206 for a second user 104 that may be projected for display onto a surface within the environment. For instance, a parent may want to inform a child that they have prepared an after-school snack. Accordingly, when the child enters the kitchen, the system 200 may project an appropriate message 206 onto the refrigerator (e.g., "Hi Bobby. Your snack is in the refrigerator. Love, Mom"), which may alert the child that a snack has been prepared for them. That is, if the first user 104 specifies that the message 206 is directed at a different user 104, the message 206 may convey a communication to that user 104. Alternatively, the message 206 may serve as a reminder for the first user 104.

As mentioned previously, the messages 206 may be provided to users 104 based at least partly on the conditions that are input to the projection device 102. For example, the first user 104 may specify when the message 206 is to be projected, such as when a user 104 enters the environment, exits the environment, enters a room, performs a specified action, etc. The first user 104 may also specify the content and type of message 206 to be projected, meaning that the first user 104 may specify that the message 206 should be visually projected as a text-based message, an image, flickering lights, etc. The messages 206 may also be audibly output, where the messages 206 may comprise of a recorded voice, a computer-generated voice, an alarm or siren, beeping, etc. The first user 104 may specify how the messages 206 should be projected, such as specifying a color of the message 206 or an urgency (e.g., very urgent, not urgent, etc.), which may be represented by a color (e.g., red represents urgent, green represents not urgent, etc.).

In addition, the first user 104 may specify where the messages 206 are to be projected. That is, the first user 104 may indicate the portion(s) of the environment (e.g., specific rooms, etc.) in which the messages 206 are to be projected and a location or surface in which the messages 206 are to be projected upon (e.g., a wall, the floor, a table, etc.). That way, the projection device 102 may know when, where, how, and to whom the messages 206 are to be projected.

In various embodiments, when the projection device 102 detects, identifies, and possibly authenticates a particular user 104, determines that there are messages 206 that are intended for or are relevant to that user 104, and determines that the user 104 has performed a particular action, the projection device 102 may visually and/or audibly output the appropriate messages 206 to that user 104. That is, the projection device 102 may project customized, context-dependent, and user-specific messages 206 within the environment. For instance, if a mother would like her child to do his/her homework, she may cause the projection device 102 to project a message 206 (e.g., "do your homework") when the child enters the environment (e.g., arrives home from school). Moreover, a user 104 may have certain health or lifestyle goals and, therefore, may instruct the projection device 102 to project messages 206 to remind the user 104 of such goals. As an example, if the projection device 102 detects that the user 104 grabs, or is about to grab, a soda out of the refrigerator, the projection device 102 may project the amount of calories for that soda, which may dissuade the user 104 from drinking the soda, and which may align with his/her health goals. Instead, a message 206 that encourages the user 104 to instead drink a glass of water may be projected.

The messages 206 that are projected may be location-specific, meaning that the messages 206 that are projected in different areas of the environment may be relevant to those areas. For example, a message 206 that serves as a reminder to make a certain telephone call may be projected in close proximity to the telephone and in response to the system identifying the user within a threshold proximity of the telephone. Moreover, a message 206 that directs a user 104 to change the laundry may be projected near a laundry room. As another example, a message 206 that is directed to various health or dieting goals may be projected in the kitchen, and possibly near the refrigerator or cupboards that include unhealthy foods.

In other embodiments, the messages 206 may be projected at one or more specific locations and/or the messages 206 may be projected based on the context of those messages 206. For example, each user 104 may receive messages 206 intended for them at a single location, which may serve as a message board or a message mailbox that the user 104 may access to receive their messages 206. Alternatively, the messages 206 may be projected at a location where an action associated with the message 206 is to occur. For example, a message 206 for a child to eat a banana may be projected to child when the child is in the kitchen in close proximity to the bananas. As a result, the user 104 that input the message 206 may be able to dictate or control a location, a time, and a context in which the message 206 is to be projected and a presentation of the projected message 206.

Furthermore, instead of receiving the messages 206 within the environment, users 104 may access the messages 206 remotely via a mobile device or another computing device, for example. In some embodiments, the messages 206 may be provided to a particular user 104 provided that the user 104 is able to authenticate himself as an intended recipient of the message 206. In addition, users 104 may transmit messages 206 directly between mobile devices utilizing the projection device 102.

In certain embodiments, in addition to authenticating a particular user 104 prior to a message 206 being projected to that user 104, the projection device 102 may also confirm that no other users 104 are in close proximity to that user 104. That way, the message 206 may then remain private and confidential for the intended recipient of the message 206. To accomplish this, the projection device 102 may utilize its sensor(s) 116 to monitor the surrounding environment to determine whether any other users 104 are present. If other users 104 are in close proximity, the projection device 102 may refrain from projecting that message 206, at least until the other user 104 is no longer able to see or hear the message 206, when output. Moreover, users 104 may also specify that particular users 104 are to be excluded from accessing a message 206. For example, if a particular message 206 related to a user's 104 surprise birthday party, the projection device 102 may confirm that that user 104 is not present when the message 206 is projected. As a result, that user 104 will be unable to access that message 206.

Accordingly, the system 200 illustrated in FIG. 2 may project context-dependent and user-specific messages within an environment, where the conditions in which those messages are to be projected may be input by a user. As a result, the system 200 may allow users to convey messages to one another, and/or allow the system 200 to project reminder messages to themselves. Such messages may relate to lifestyle management or the fulfillment of goals, whether those goals relate to health (e.g., diet, weight, exercise, etc.), household duties, finances, or time management.

Projection of Warnings

Figure 3:
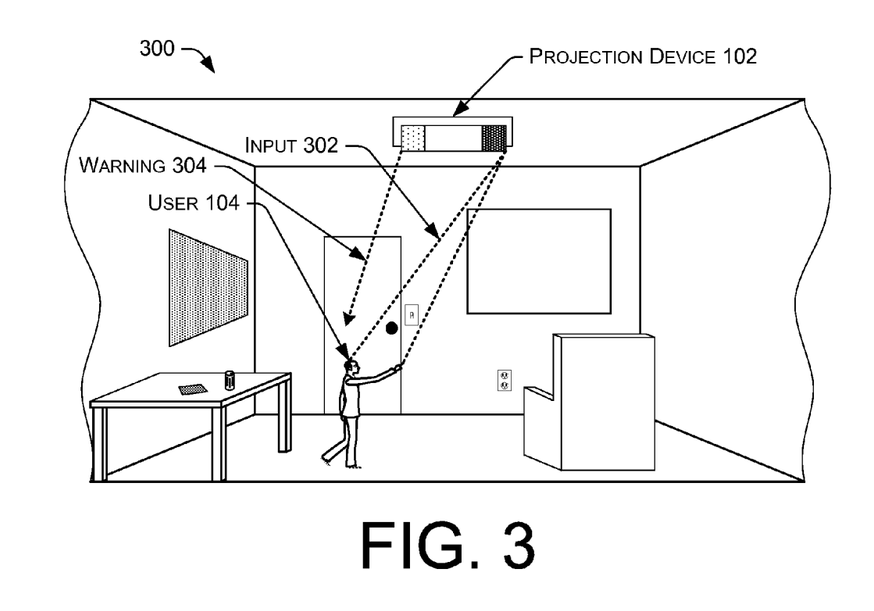
FIG. 3 is a diagram showing an example environment that includes a projection device that may project one or more warnings to users within the environment.

FIG. 3 illustrates a diagram representing an example system 300 for projecting one or more warnings to users within an environment. More particularly, the system 300 may monitor for specific events or user actions and then project visual warnings and/or audible cues when it is determined that those specific events or user actions in fact occur, or are likely to occur.

As shown, the system 300 may include a projection device 102, as illustrated above with respect to FIGS. 1 and 2, a user 104, input 302, and a projected warning 304. In various embodiments, the projection device 102 may monitor the environment to detect users 104 and actions performed by those users 104. Moreover, one or more users 104 may input to the projection device 102 certain actions or events that may trigger a particular warning 304 to be projected by the projection device 102. In some embodiments, the actions or events may correspond to one or more known or potential dangers within the environment (e.g., a flight of stairs, a hot stove, an electrical outlet, etc.). With those actions or events, the user 104 may input one or more warnings 304 that are specifically associated to those actions or events. As a result, when the projection device 102 determines that a particular action or event has occurred (e.g., input 302), or is about to occur, the projection device 102 may then project the appropriate warning 304 within the environment. The warnings 304 may be output in a visual and/or audible manner such that the users 104 within the environment may be alerted of the potential dangers.

In certain embodiments, once the projection device 102 receives actions or events that may trigger a particular warning 304, the projection device 102 may continuously monitor the environment for users 104. When a particular user 104 is detected and identified, which may be referred to as input 302, the projection device 102 may project the appropriate warning 304 to that user 104. For example, assume that the environment was a home, that a child lived in the home, and that a parent identified a flight of stairs, a stove, and an electrical outlet as potential dangers within the home. The projection device 102 may maintain this information and monitor the environment in order to detect when the child comes in close proximity (e.g., within a threshold distance) to these potential dangers. If this occurs, the projection device 102 may project a warning 304 to the child in order to alert the child of these dangers. This may prevent the child from being at risk to these dangers (e.g., falling down the stairs, burning a hand on the hot stove, etc.) and may also alert a parent that the child is in close proximity to such dangers.

For example, assume that a first user (e.g., parent, caregiver, etc.) is concerned that a second, different user 104

(e.g., a child, an elderly person, etc.) may become injured by falling down a flight of stairs. The system 300 may allow first user 104 to cause the projection device 102 to project a warning 304 when the second user 104 comes in close proximity to the stairs. That is, when the second user comes within a predetermined proximity (e.g., five feet) of the stairs, the projection device 102 may project an appropriate warning 304 to the second user 104. Such a warning 104 may include flashing lights, an audible alarm or siren, a recorded voice and/or projecting a colored line or image in front of the stairs. As a result, the second user 104 may be alerted to the potential danger and the first user 104 may be informed that the second user 104 is in close proximity to the stairs.

In addition to alerting users 104 of potential dangers, the warnings 304 may also help allow users 104 to learn of these dangers. For instance, the warnings 304 may include a colored (e.g., red) line that the child is to stay behind, a circle around the potential danger, an unpleasant image (e.g., a frown face), flashing lights, an audible command, or an audible alarm or beeping. That way, the user 104 may be persuaded to stay away from the potential dangers in the future. The warning 304 may also include a visual or audible projection that distracts the user 104 from the potentially dangerous condition. Further still, the warnings 304 may also cause parents to learn the behavior of their children, which may allow the parents to better educate the children of such potential dangers and possibly remove the dangers from the environment.

In certain embodiments, the warnings 304 projected by the projection device 102 may be user-specific. That is, the warnings 304 may be specific to, or customized for, each user 104 within the environment. Since the same dangers may not apply to different users 104, a first set of warnings 304 may be applicable to a first user 104, a second set of warnings 304 may be applicable to a second user 104, and so on. The warnings 304 may also be object-specific, meaning that different warnings 304 may be projected based at least partly on the object that is in close proximity, and may therefore be dangerous to, one of the users 104. As a result, a customized warning 304 may be projected by the projection device 102 depending upon which particular user 104 is detected and identified and which objects are in close proximity to that user 104.

The warnings 304 may also be location specific, meaning that different areas or objects 106 within the environment may be associated with the warning 304 or set of warnings 304. For instance, if it is determined that a set of stairs, a hot stove, and an electrical outlet are all likely to be dangerous to a child, the same or similar warning 304 may be projected if the projection device 102 determines that is in close proximity to those objects 106. Accordingly, the same or similar warnings 304 may apply to multiple different dangers or conditions within the environment.

As stated above, the warnings 304 may be projected reactively, meaning that the warnings 304 may be projected when certain conditions are satisfied (e.g., a user 104 being in close proximity to an object 106). However, alternatively, or in addition, the warnings 304 may be projected in a proactive manner. That is, the projection device 102 may monitor the environment in order to identify certain conditions that may pose a danger for one or more users 104. When a potential danger is identified, the projection device 102 may project a suitable warning 304, which may alert one or more users 104 of that potential danger. In response, the one or more users 104 may elect to remedy that potential danger. For example, if the projection device 102 determined that a baby gate to a stairwell was open, or that a stove remained on, the projection device 102 may project an appropriate warning 304 that may alert users 104 within the environment of such dangers. In addition, the projected warning 304 may include visual (e.g., a projected line, a color, a light, etc.) and/or audio (e.g., beeping, etc.) projections that may encourage users 104 to stay away from such dangers.

Example Projection Device

Figure 4:
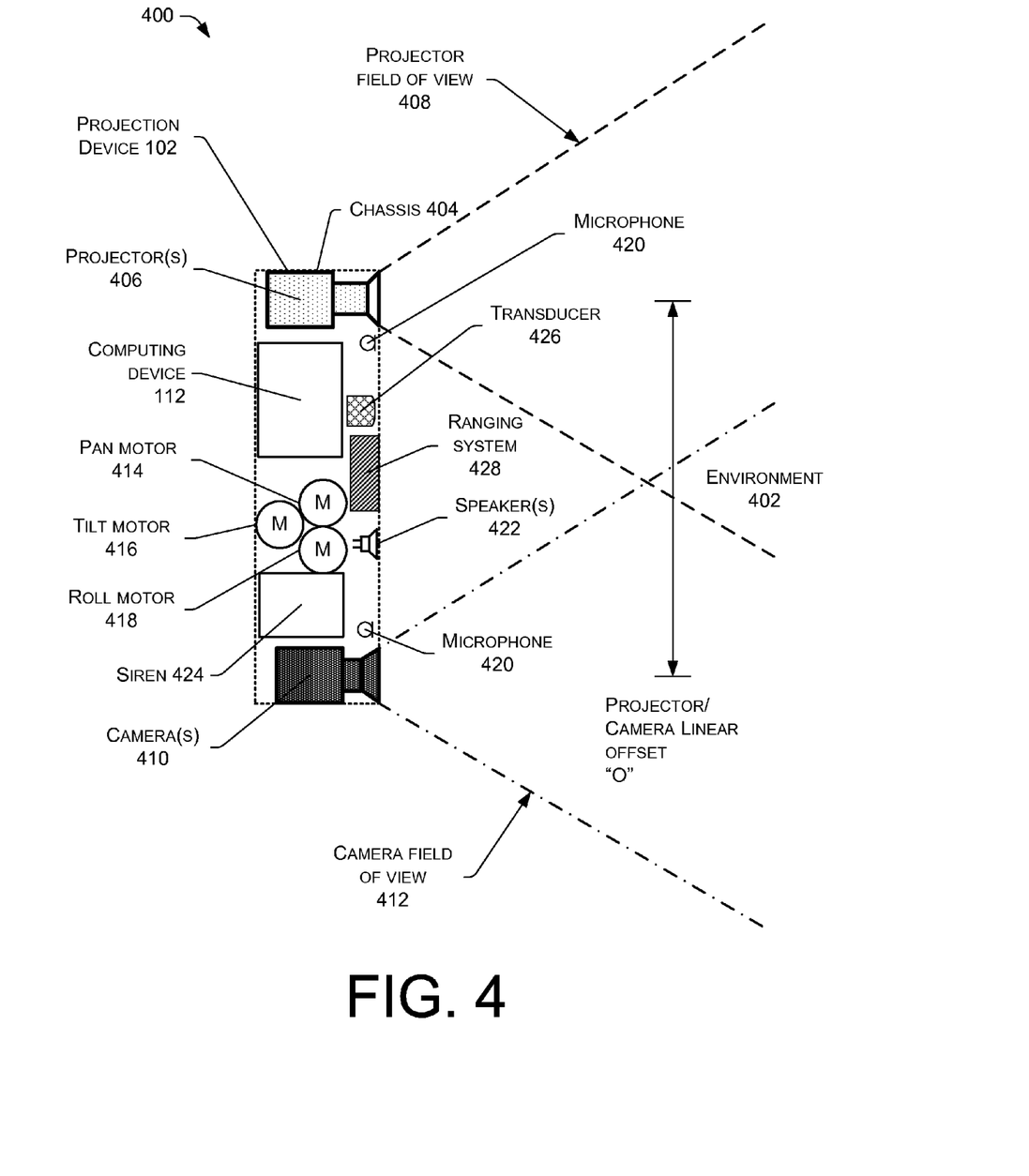
FIG. 4 is a diagram showing an example projection device that is configured to receive input regarding an environment and provide customized output to users within that environment.

FIG. 4 illustrates a diagram representing an example system 400 for projecting output to users within an environment. In some embodiments, the system 400 may correspond to the projection device 102, as described above with respect to FIGS. 1-3. The projection device 102 may be configured to scan at least a portion of an environment 402 and the users and/or objects therein to detect, identify, and authenticate the users and/or objects. The projection device 102 may also be configured to provide augmented reality output, such as images, video, text, sounds, and so forth.

In some embodiments, a chassis 404 may hold the components of the projection device 102. One or more projector(s) 406 may be disposed within the chassis 404 and may be configured to generate and project audio, light, and/or images into the environment 402. These images may be visible light images perceptible to a user 104, visible light images imperceptible to the user 104, images with non-visible light, or a combination thereof. The projector(s) 406 may be implemented with any number of technologies capable of generating an image and projecting that image onto a surface within the environment 402. Suitable technologies include a digital micromirror device (0), liquid crystal on silicon display (LCOS), liquid crystal display, 3LCD, and so forth. The projector(s) 406 also have a corresponding projector field of view 408 which describes a particular solid angle. The projector field of view 408 may vary according to changes in the configuration of the projector(s) 406. For example, the projector field of view 408 may narrow upon application of an optical zoom to the projector(s) 406.

In some implementations, the projection device 102 may instruct devices that are separate from, but at least partially controllable by, the projection device 102 to visually or audibly output content. For instance, the projection device 102 may instruct a television or other display device within the environment 402 to output a particular piece of visual content. Or, the projection device 102 may instruct stereo speakers within the environment 402 to output certain audible content. In these instances, the projector(s) 406 may project non-visible structured light (or other types of light for sensing users 104 or objects 106 and/or for sensing movement within the environment 402), while utilizing other output devices within the environment 402 to output requested content, including content associated with one or more conditions that are satisfied. Of course, in other instances the projector(s) 406 may be used instead of, or in addition to, the existing output devices within the environment 402.

One or more camera(s) 410 may also be disposed within the chassis 404. The camera(s) 410 may be configured to image or capture the environment 402 in visible light wavelengths, non-visible light wavelengths, or both. The camera(s) 410 have a corresponding camera field of view 412 that describes a particular solid angle. The camera field of view 412 may vary according to changes in the configuration of the camera(s) 410. For example, an optical zoom of the camera 410 may narrow the camera field of view 412.

In some implementations, multiple camera(s) 410 may be used. For instance, one embodiment of the projection device 102 may include a three-dimensional (3D), infrared (IR) camera and a red-green-blue (RGB) camera. The 3D, IR camera may be configured to capture information for detecting depths of users 104 or objects 106 within the environment 402, while the RGB camera may be configured to detect edges of users 104 or objects by identifying changes in color within the environment 402. In some instances, a single camera 410 may be configured to perform these functions.

The chassis 404 may be mounted with a fixed orientation, or may be coupled via an actuator to a fixture such that the chassis 404 may move. Actuators may include piezoelectric actuators, motors, linear actuators, and other devices configured to displace or move the chassis 404 or components therein such as the projector(s) 406 and/or the camera(s) 410. For example, in some embodiments, the actuator may comprise a pan motor 414, a tilt motor 416, and so forth. The pan motor 414 may be configured to rotate the chassis 404 in a certain motion, such as a yawing motion. The tilt motor 416, meanwhile, may be configured to change the pitch of the chassis 404. In some instances, the projection device 102 may additionally or alternatively includes a roll motor 418, which may allow the chassis 404 to move in a rolling motion. By panning, tilting, and/or rolling the chassis 404, different views of the environment 402 may be obtained.

One or more microphones 420 may be disposed within the chassis 404, or elsewhere within the environment 402. These microphones 420 may be used to acquire input from a user 104, for echolocation, location determination of a sound, or to otherwise aid in the characterization of and receipt of input from the environment 402. For example, user 104 may make a particular noise, such as a cough, a throat clear, a tap on a wall, or snap of the fingers, which are pre-designated as attention command inputs or as object detection noises. A user 104 may also use voice commands to control various aspects of the projection device 102. Such audio inputs may be located within the environment 402 using time-of-arrival differences among multiple microphones 420 and used to summon an active zone within the environment 402 or to identify a location of users 104.

One or more speaker(s) 422 may also be present to provide for audible output, such as a siren, warning noises, animal noises, voices, and other noises including other messages or warnings that may be projected, and thus conveyed, to users 104. The speaker(s) 422 may be used to provide non-security functions, such as the output from a text-to-speech module or to playback pre-recorded audio. A special-purpose siren 424, configured to produce loud-volume high-intensity noises, may be included, and the projection device 102 may cause the siren 424 to sound an alarm or beeping in response to a particular condition being satisfied (e.g. user 104 enters the environment 402, user 104 comes in close proximity to a potential danger, etc.).

A transducer 426 may be present within the projection device 102, or elsewhere within the environment 402, and may be configured to detect and/or generate inaudible signals, such as infrasound or ultrasound. These inaudible signals may be used to provide for signaling between accessory devices and the projection device 102.

The projection device 102 may also include a ranging system 428. The ranging system 428 may be configured to provide distance information from the projection device 102 to a scanned user 104, or other objects 106 within the environment 402. The ranging system 428 may comprise radar, light detection and ranging (LIDAR), ultrasonic ranging, stereoscopic ranging, and so forth. In some embodiments, the transducer 426, the microphones 420, the speaker(s) 422, or a combination thereof, may be configured to use echolocation or echo-ranging to determine distance and spatial characteristics of a user 104 or object 106.

As shown, the computing device 112 may be shown within the chassis 404. However, in other embodiments, all or a portion of the computing device 112 may be disposed in another location and coupled to the projection device 102. This coupling may occur via wire, fiber optic cable, wirelessly, or a combination thereof. Furthermore, additional resources external to the projection device 102 may be accessed, such as resources in another projection device 102 that is accessible via a local area network, cloud resources accessible via a wide area network connection, or a combination thereof.

Also shown in this illustration is a projector/camera linear offset designated "O". This may represent a linear distance between the projector(s) 406 and the camera(s) 410. Placement of the projector(s) 406 and the camera(s) 410 at distance "O" from one another may aid in the recovery of structured or other light data from the environment 402. The known projector/camera linear offset "O" may also be used to calculate distances, dimensioning, and otherwise aid in the characterization of users 104 or objects 106 within the environment 402. In other embodiments, the relative angle and size of the projector field of view 408 and camera field of view 412 may vary. Also, the angle of the projector(s) 406 and the camera(s) 410 relative to the chassis 404 may vary.

In various embodiments, the components of the projection device 102 may be distributed in one or more locations within the environment 402. As mentioned above, microphones 420 and speaker(s) 422 may be distributed throughout the environment 402. The projector(s) 406 and the camera(s) 410 may also be located in separate chasses 404. The projection device 102 may also include discrete portable signaling devices used by users 104 to issue command attention inputs. For example, these may be acoustic clickers (audible or ultrasonic), electronic signaling devices such as infrared emitters, radio transmitters, and so forth.

The projection device 102 illustrated in FIG. 4 is shown with various sensors, but other sensors may be located either within, or external to, the chassis 404. The sensors may include, in various embodiments, cameras (motion and/or still cameras), audio sensors such as microphones, ultrasound transducers, heat sensors, motion detectors (including infrared imaging devices), depth sensing cameras, weight sensors, touch sensors, tactile output devices, olfactory sensors, temperature sensors, humidity sensors, pressure sensors, and so forth.

Example Process for Projecting Messages

Figure 5:
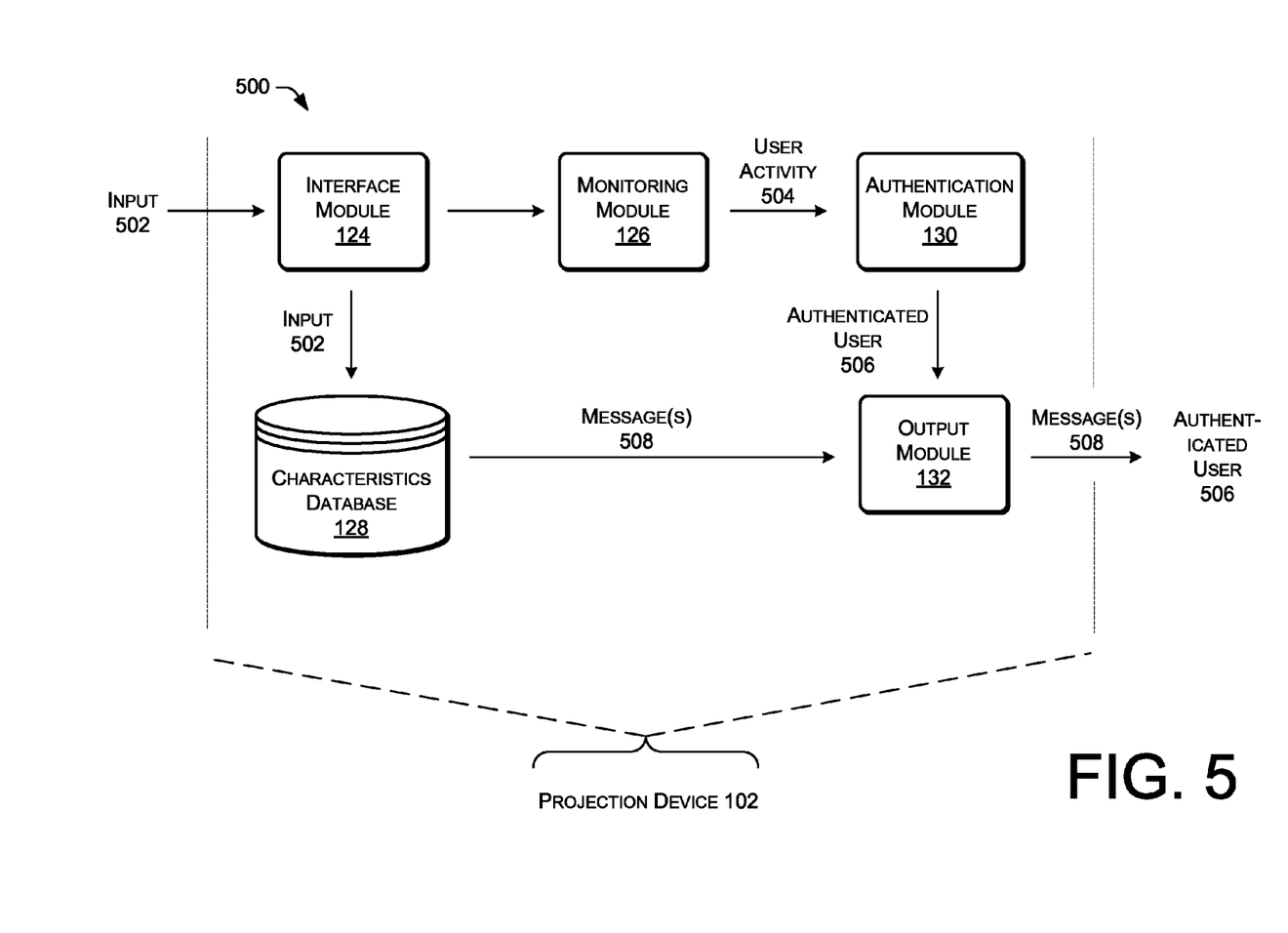
FIG. 5 is a diagram showing an example process for projecting context dependent messages to users.

FIG. 5 illustrates a diagram representing an example system 500 for projecting one or more messages within an environment. More particularly, the system 500 may cause one or more context-dependent and user-specific messages to be projected to one or more users within the environment. In various embodiments, the processes and techniques described below with respect to FIG. 5 may be performed by the projection device 102. As shown, the projection device 102 may include an interface module 124, a monitoring module 126, a characteristics database 128, an authentication module 130, and an output module 132.

In various embodiments, the interface module 124 of the projection device 102 may receive input 502 from one or more users 104. The input 502 may include various output that is to be projected by the projection device 102 (e.g., messages) and other information that represents a context and manner in which the output is to be projected. Moreover, the input 502 may correspond to one or more conditions that are to be satisfied before the output is projected by the projection device 102. For instance, the input 502 may specify one or more actions or events associated with a particular user 104 that are to occur before the output is projected within the environment. Upon receiving the input 502, the input 502 may be stored by the characteristics database 128 for subsequent use.

The monitoring module 126 may then monitor the environment to detect one or more users 104 or the actions or events identified in the input 502. In certain embodiments, the monitoring module 126 may identify various user activity 504 within the environment. For instance, the monitoring module 126 may detect the presence of a particular user 104 or the user 104 performing some action, such as a movement of the user 104 within the environment. The monitoring module 126 may then identify that user 104 and determine whether there is any output that is applicable to that user 104. For example, the monitoring module 126 may determine whether it should to project one or more messages 508 to the user 104.

In example embodiments, upon identifying the user 104, the authentication module 130 may authenticate the user 104 to determine whether the user 104 is the intended recipient for the output. For example, assuming that the input 502 included one or more messages 508 for a certain user 104, the authentication module 130 may determine whether the detected user 104 is to receive one or more of those messages 508. If not, the projection device 102 may refrain from projecting any messages 508 at that time. However, if the detected user 104 is in fact authenticated, that user 104 may be referred to as an authenticated user 506.

In response to detecting, identifying, and authenticating a particular user 104 (e.g., the authenticated user 506), the output module 132 may project the message(s) 508 to the authenticated user 506. More particularly, the message(s) 508 may be projected within the environment in the context and manner prescribed by the input 502. In some embodiments, the message(s) 508 may be projected visually onto a surface within the environment and/or audibly within the environment. Furthermore, the message(s) 508 may be provided by the characteristics database 128. As a result, users 104 within the environment may receive customized, context-dependent, and user-specific messages 508 that are projected within the environment.

Example Process for Projecting Warnings

Figure 6:
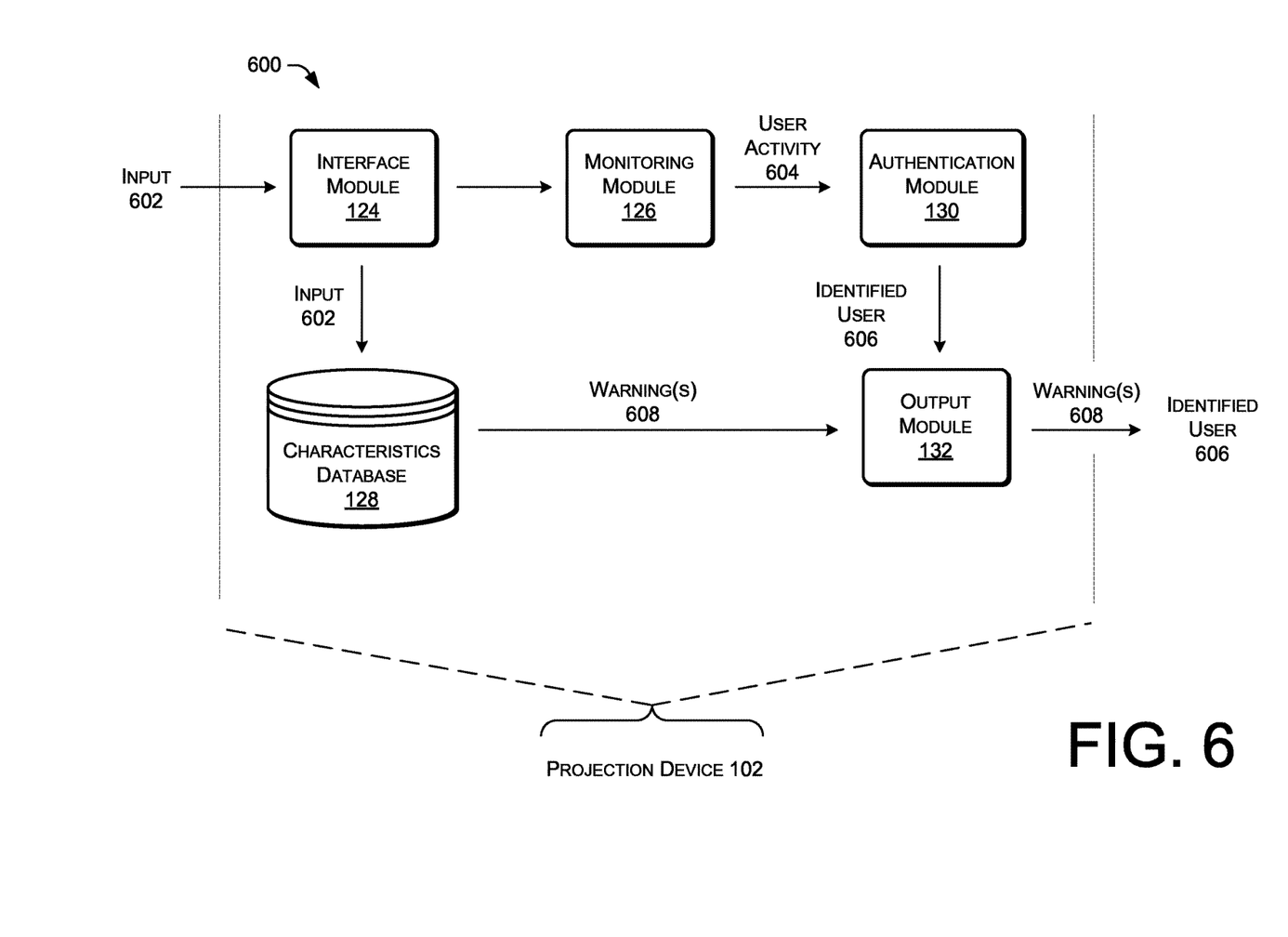
FIG. 6 is a diagram showing an example process for projecting context dependent warnings to users.

FIG. 6 illustrates a diagram representing an example system 600 for projecting warnings within an environment. More particularly, the system 600 may cause one or more context-dependent and user-specific warnings to be projected to one or more users within the environment. In various embodiments, the processes and techniques described below with respect to FIG. 6 may be performed by the projection device 102. As shown, the projection device 102 may include an interface module 124, a monitoring module 126, a characteristics database 128, an authentication module 130, and an output module 132.

In various embodiments, the interface module 124 may receive input 602 from one or more users 104. The input 602 may identify various events, user actions, or potential dangers within the environment. For example, the input 602 may identify various dangers (e.g., a staircase, a hot stove, an electrical outlet, etc.) in which certain users 104 (e.g., children) may be at risk. The input 602 may also include a context and manner in which the warnings 608 may be projected, such as a particular user 104 coming within a threshold distance from the potential dangers. Accordingly, users 104 may specify various conditions that determine when, where, how, and to whom the warnings 608 are to be projected. Upon receiving the input 602, the input 602 may be maintained in the characteristics database 128 for subsequent use.

The monitoring module 126 may monitor the environment to detect various users 104, actions, or events that occur within the environment. For example, the monitoring module 126 may monitor for the conditions specified in the input 602. In various embodiments, the monitoring module 126 may detect certain user activity 604, such as a user 104 being in close proximity to one of the potential dangers identified in the input 602.

In response to detecting a particular user 104, or an action being performed by that user 104 (e.g., movement within the environment), the authentication module 130 may attempt to identify that user 104. If successful, that user 104 may be referred to as an identified user 606. Upon identifying the user 104, the characteristics database 128 may determine one or more appropriate warning(s) 608 that are suitable to the identified user 606 and the context of the user activity 604. For instance, if it is determined that the identified user 606 is a child and the user activity 604 indicates that the child is in close proximity to a hot stove, the output module 132 may project a warning 608 to the identified user 606. Such a warning 608 may alert the identified user 606 of the potential danger for the purpose of persuading the identified user 606 to move away from the potential danger. As stated above, the warning(s) 608 may be output in any manner (e.g., visually, audibly, etc.). Accordingly, the warning(s) 608 projected by the projection device 102 and directed to the identified user 606 may depend on the input 602 provided to the projection device 102, the particular user 104 that is identified, and actions being performed by that user 104.

Example Processes

Figure 7:
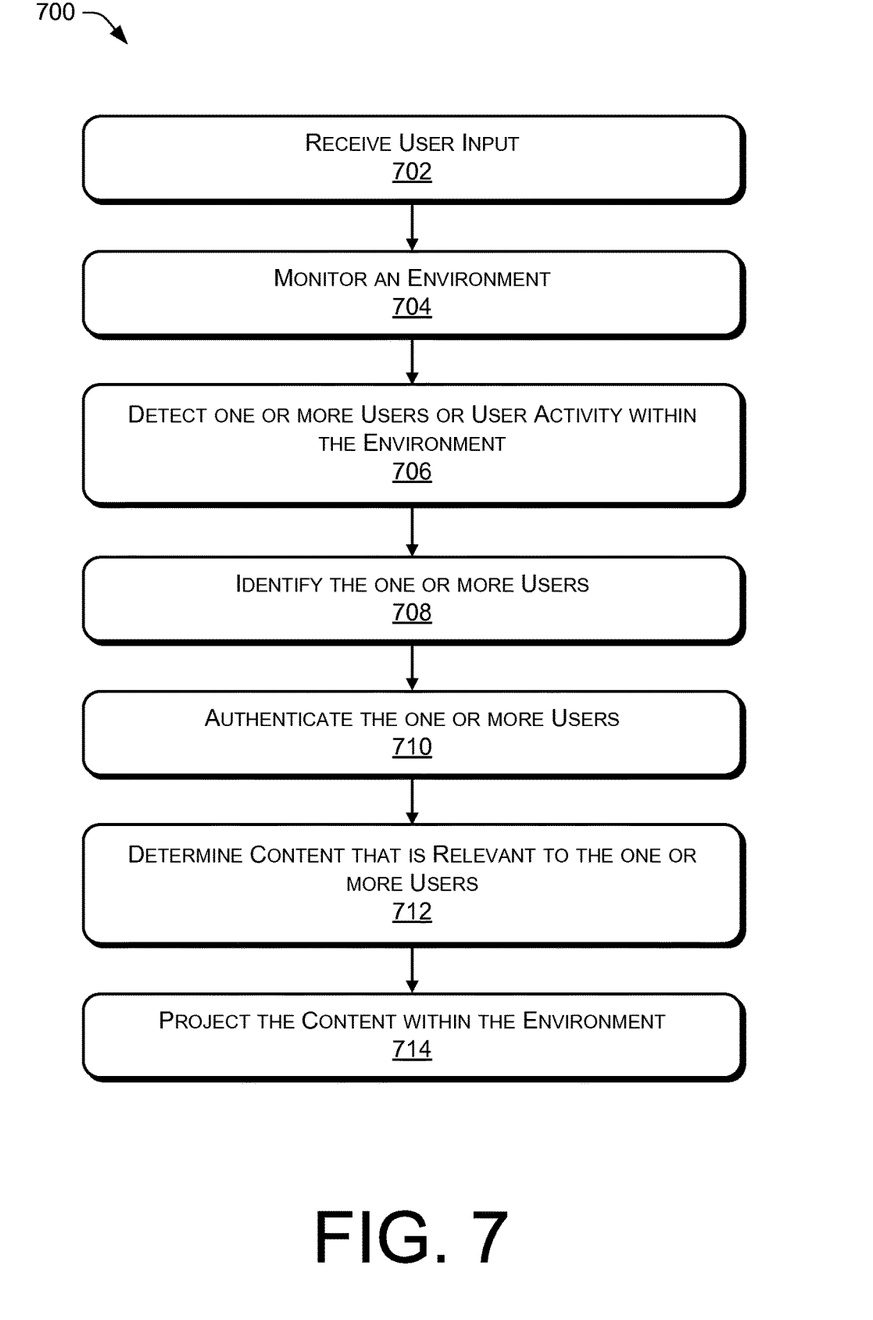
FIG. 7 is a flow diagram showing an example process for projecting various types of output to users based at least partly on monitoring within an environment.

FIG. 7 describes various example processes projecting visual and audible content to users within an environment. The example processes are described in the context of the environment of FIGS. 1-6 but are not limited to those environments. Each process described in this disclosure is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. Finally, the order in which the operations are described is not intended to be construed as a limitation, and any number of the described operations can be combined in any order and/or in parallel to implement the process.

FIG. 7 is a flow diagram illustrating an example process 700 of projecting visual and audible content to users within an environment. Moreover, the following actions described with respect to FIG. 7 may be performed by the projection device 102, as shown in FIGS. 1-6.

Block 702 illustrates receiving user input. In particular, one or more users may input various types of information relating to a context and manner in which content is to be projected within an environment. In various embodiments, the content may include visual or audible messages or warnings, images, graphics, lights, sounds (e.g., beeping, an alarm, etc.), etc. In addition, such information may include conditions that are to be satisfied prior to the content being projected within the environment. For instance, the conditions may relate to an identification of users or certain actions, such as those performed by the users, that trigger the content being projected.

Block 704 illustrates monitoring an environment. For instance, the projection device may monitor the environment by capturing audio, images, or video of the environment, which may be referred to as environmental data or input. Such data may be captured using cameras, sensors, microphones, or other devices that may be utilized to monitor the environment.

Block 706 illustrates detecting one or more users or user activity within the environment. More particularly, the projection device may detect one or more users within the environment. The projection device may also detect various actions being performed by such users. For instance, provided that the environment is a home, the projection device may detect users entering and exiting the house, or a room, or the movement of users within the rooms.

Block 708 illustrates identifying the one or more users. In response to determining that one or more users are present within the environment, the projection device may specifically identify those users using the techniques described herein. As a result, the projection device may become aware of the identity of users that are currently within the environment.

Block 710 illustrates authenticating the one or more users. That is, upon identifying users within the environment, the projection device may authenticate the users to determine that the detected and identified users are in fact users that are known by the system.

Block 712 illustrates determining content that is relevant to the one or more users. In some embodiments, once the users within the environment are detected, identified, and possibly authenticated, the projection device may determine whether any of the inputted content (e.g., messages, warnings, etc.) is intended for those users. For instance, it may be determined that an authenticated user is an intended recipient for one or more messages that were received by the projection device. Moreover, the user may have performed some action (e.g., walked near the laundry room) that triggered a particular message (e.g., "change the laundry") that is to be projected to that user. In other embodiments, the user may be in close proximity to an object in the environment that is determined to be a potential danger or hazard (e.g., a staircase, a hot stove, etc.). In that case, coming within a threshold distance of that object may cause a particular message or warning that is relevant to that object to be projected.

Block 714 illustrates projecting the content within the environment. In certain embodiments, the projection device may visually and/or audibly output content, such as messages, warnings, images, graphics, colors, alarms, beeping, etc., within the environment. In the case of visual projections, the content may be projected onto any surface within the environment. Furthermore, the content may be projected in view of the input initially received by the projection device. As a result, the projection device may project context-dependent and user-specific content within the environment in order to convey some meaning to users that are within the environment.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   memory;
   one or more processors;
   a projector configured to project content in an environment;
   an actuator to change an orientation of the projector to project the content at different locations in the environment;
   an image sensor configured to detect objects within the environment; and
   computer-executable instructions stored in the memory and executable by the one or more processors to perform operations comprising:
      receiving the content;
      receiving information indicating one or more conditions that are to be satisfied in order for the content is to be projected within the environment by the projector;
      receiving information indicating a location within the environment at which the content is to be projected;
      monitoring the environment;
      based at least in part on monitoring the environment, detecting at least one user within the environment;
      based at least in part on detecting the at least one user within the environment, determining that the one or more conditions are satisfied; and
      based at least in part on determining that the one or more conditions are satisfied, causing the actuator to change the orientation of the projector to project the content at the location within the environment.

2. The system as recited in claim 1, wherein the image sensor is a red-green-blue sensor or a three-dimensional sensor.

3. The system as recited in claim 1, the operations further comprising, prior to the content being projected within the environment:
   determining that the content is a message;
   determining that the message is intended for or is addressed to the at least one user; and
   authenticating the at least one user with respect to the message.

4. The system as recited in claim 1, wherein the content includes:
   a message that is directed to the at least one user from a different user;
   a reminder that is input by the at least one user; or
   a warning that is directed to the at least one user from the different user.

5. A method comprising:
   under control of one or more processors of a computing device that couples to a projector and an actuator to change a field of view of the projector,
   receiving content for display within an environment;
   receiving an indication of a location within the environment at which the content is to be projected by the projector;
   receiving one or more conditions associated with the content that, when satisfied, result in the computing device projecting the content at the location using the projector;

receiving information captured by one or more sensors that are configured to capture at least one of audio data, video data, or images of at least part of the environment;

analyzing the information captured by the one or more sensors;

determining, based at least in part on analyzing the information, that the one or more conditions within the environment have been satisfied; and based at least in part on determining that the one or more conditions are satisfied:

changing the field of view of the projector using the actuator based at least in part on the location within the environment; and causing the projector to project the content at the location.

6. The method as recited in claim 5, wherein causing the projector to project the content comprises causing the projector to project one or more of: a message, a warning, an image, a sound, or a light at the location.

7. The method as recited in claim 5, wherein receiving the one or more conditions comprises receiving a context in which the content is to be projected and a manner in which the content is to be projected.

8. The method as recited in claim 5, wherein receiving the one or more conditions comprises receiving input indicating the one or more conditions associated with the content.

9. The method as recited in claim 5, wherein determining that the one or more conditions have been satisfied comprises:

detecting a user within the environment;

identifying the user based at least in part on the one or more conditions; and authenticating the user.

10. The method as recited in claim 5, wherein determining that the one or more conditions have been satisfied comprises:

detecting a user within the environment;

identifying the user based at least in part on the one or more conditions; and determining that the user is within a threshold distance of an object in the environment, and wherein the location corresponds to a location of the user or the object.

11. The method as recited in claim 5, further comprising:

detecting a user within the environment; and determining a type of the content that is projected at the location based at least in part on an identity of the user.

12. The method as recited in claim 5, further comprising:

detecting an action performed by a user within the environment; and determining a type of the content that is projected at the location based at least in part on the action performed by the user.

13. One or more non-transitory computer-readable media having computer-executable instructions that, when executed by one or more processors of a computing device that couples to a projector and an actuator to change a field of view of the projector, cause the one or more processors to perform operations comprising:

receiving content for display within an environment;

receiving an indication of a location within the environment at which the content is to be projected;

receiving a condition associated with the content that, when satisfied, causes the content is to be projected at the location using the projector, the condition including at least one of:

identifying a particular user; or identifying an action performed by a user;

receiving information from one or more sensors, the information representing at least one of audio data, video data, or images of at least part of the environment;

analyzing the information;

determining, based at least in part on analyzing the information, that the condition has been satisfied; and based at least in part on determining that the condition has been satisfied:

changing the field of view of the projector using the actuator based at least in part on the location within the environment; and causing the projector to project the content at the location.

14. The one or more non-transitory computer-readable media as recited in claim 13, wherein determining that the condition has been satisfied comprises:

identifying the particular user within the environment; and authenticating the particular user.

15. The one or more non-transitory computer-readable media as recited in claim 14, wherein determining that the condition has been satisfied comprises identifying the particular user performing the action.

16. The one or more non-transitory computer-readable media as recited in claim 13, wherein determining that the condition has been satisfied comprises identifying the user performing the action.

17. The one or more non-transitory computer-readable media as recited in claim 13, wherein the operations further comprise:

identifying a different user within the environment;

determining that the content is relevant to the different user; and causing the projector to project the content at another location, wherein the another location corresponds to a location of the different user.

18. The one or more non-transitory computer-readable media as recited in claim 13, wherein causing the projector to project the content at the location comprises projecting the content based at least partly on a context and a manner.

19. A system comprising:

a projector;

an actuator, configured to move the projector to change a field of view of the projector;

memory;

one or more processors;

a interface module maintained in the memory and executable by the one or more processors to receive:

an identification of at least one object within an environment;

an identification of at least one user associated with the at least one object; and content to be projected by the projector within the environment;

a monitoring module maintained in the memory and executable by the one or more processors to determine that the at least one user is within a threshold distance from the at least one object; and an output module maintained in the memory and executable by the one or more processors to, at least partly in response to determining that the at least one user is within the threshold distance from the at least one object, cause the actuator to change the field of view of the projector to project the content towards the at least one user or the at least one object.

20. The system as recited in claim 19, wherein the content projected within the environment is a warning that encourages the at least one user to remain in a same position or to move away from the at least one object.

21. The system as recited in claim 19, wherein the at least one object is determined to be a potential danger with respect to the at least one user.

22. The system as recited in claim 19, wherein the content projected within the environment is based at least partly on the identification of the at least one user detected within the environment and the identification of the at least one object that is determined to be the threshold distance from the at least one user.

* * * * *